March 8, 1938.   D. H. CASTLE   2,110,324
FOCUSING DEVICE FOR PHOTOGRAPHIC ENLARGERS
Filed Feb. 2, 1937
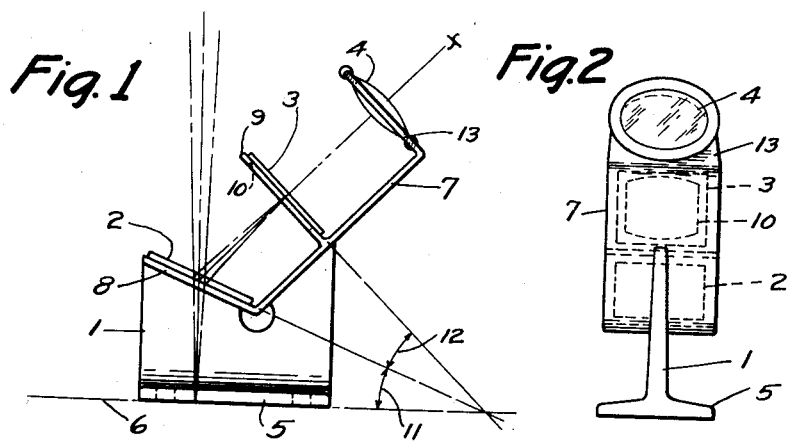
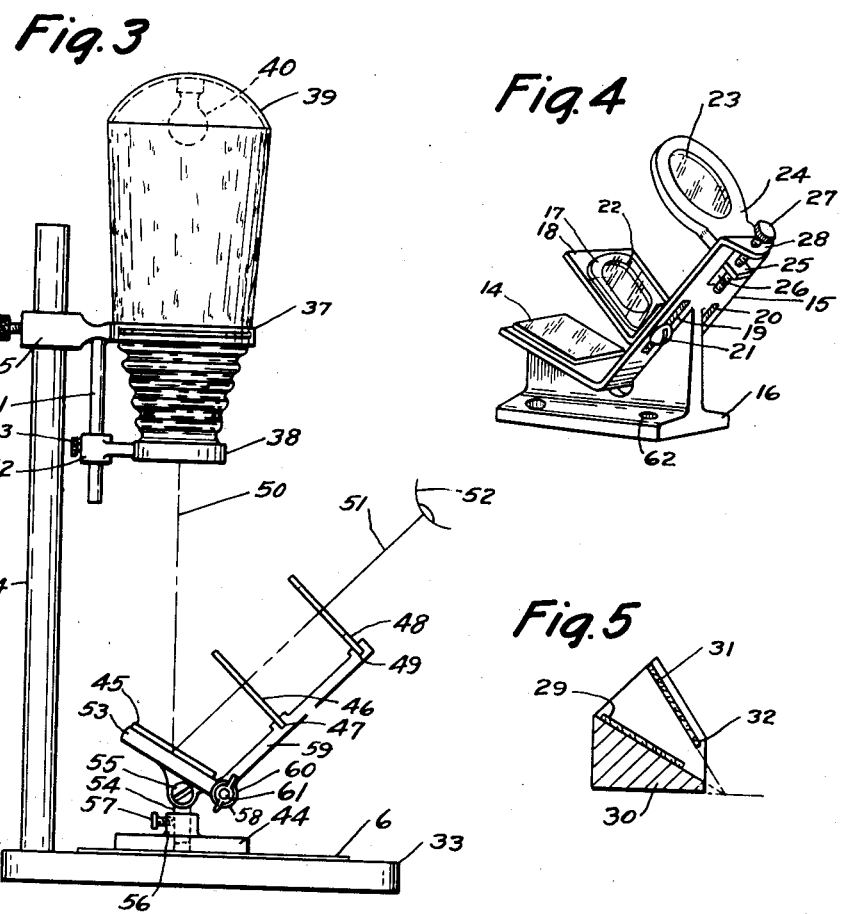
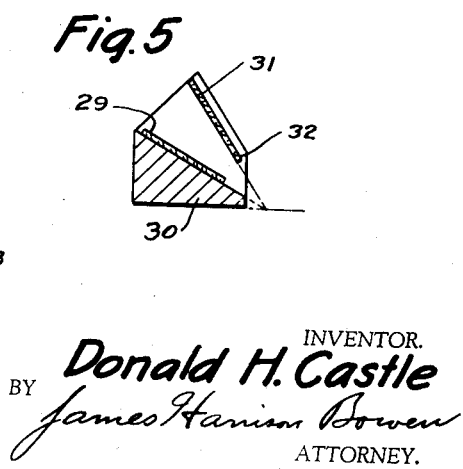
INVENTOR.
Donald H. Castle
BY James Harrison Bowen
ATTORNEY.

Patented Mar. 8, 1938

2,110,324

UNITED STATES PATENT OFFICE 2,110,324

FOCUSING DEVICE FOR PHOTOGRAPHIC ENLARGERS

Donald H. Castle, Brooklyn, N. Y.

Application February 2, 1937, Serial No. 123,649

2 Claims. (Cl. 88—24)

The purpose of this invention is to facilitate making photographic enlargements by providing a small unit which may be placed upon a surface of a plate or paper, upon which an enlargement is to be made, and into which one may readily look to determine the sharpness of the image or focus thereof.

A further purpose of this invention is to improve the ease and accuracy of focusing of a photographic enlarger, by increasing the brilliancy and size of the image viewed while focusing the enlarger.

The invention is a device consisting of a supporting base, a mirror, a ground-glass or other screen, and a positive lens or magnifying glass. The mirror and ground-glass screen are so arranged on the supporting base that the projected image from the enlarger, or a small portion of that image, may be viewed as a transparency on the ground-glass screen while focusing the enlarger. The lens is used as a simple magnifying glass, to increase the size of the image viewed.

Photographic enlargers are at present made according to several types of construction. The "vertical" enlarger operates by projecting the image downward on the sensitive paper, which is placed on the base of the enlarger support. The "horizontal" enlarger operates by projecting the image horizontally toward the easel which supports the sensitive paper in a vertical plane. The "upside-down" enlarger operates by projecting the image upwards on the sensitive paper which is supported at the top of the enlarger mechanism. When an enlarger of the horizontal or upside-down type is employed, it is a simple matter to substitute a ground-glass screen in place of the sensitive paper in order to view the image as a transparency on the screen. However, the vertical type of enlarger makes difficult the use of such a screen, since the operator would then find it necessary to view the image on that screen from underneath the supporting base of the enlarger.

There are two advantages obtained by viewing the image as a transparency on a screen, rather than viewing the same image by reflected light from the surface of the sensitive paper or some substitute for the sensitive paper. First, the transmitted image appears very much brighter to the eye than does the reflected image. Second, a magnifying glass or positive lens may be used to increase the apparent size of the transmitted image, where its use for the reflected image is very inconvenient.

The object of the invention is, therefore, to make it possible to view a projected image as a transparency on a ground-glass screen, or suitable similar screen, and to use a positive lens to magnify the image.

Another object is to provide a focusing device for photographic enlarger, in which the image may be viewed from a distance of several feet, so that it is not necessary for the operator to place his eye at, or near, the device.

Another object is to provide a focusing device which is provided as a relatively small, independent unit, so that it may be placed upon a sheet of photographic paper or the like, upon which the enlargement is to be made.

Another object is to provide a focusing device in which the image is viewed upon a ground-glass screen, or similar translucent screen.

A further object is to provide a focusing device, in which the relative positions of the parts are adjustable And a still further object is to provide a focusing device which is of a simple and economical construction.

With these ends in view the invention embodies a mirror, a ground-glass screen, and, preferably, a magnifying lens in which means is provided for mounting the mirror at an angle in relation to the surface of the photographic paper, and a ground-glass screen, also positioned at an angle and located at a distance from the mirror, equivalent to the distance from the mirror to the surface of the photographic paper.

Other features and advantages of the invention will appear from the following description, taken in connection with the drawing, wherein:

Figure 1 is a view showing a general view of the device in a comparatively simple form, arranged to be placed directly on the surface of the photographic paper.

Figure 2 is an end elevation of the device as shown in Figure 1.

Figure 3 is a view showing a typical application of the device as it may be placed upon an enlargement. The device is shown here constructed in such a manner that the respective parts are adjustable in relation to each other.

Figure 4 is a view showing an alternate device in which the respective parts are adjustable in relation to each other.

Figure 5 is a view showing another modification showing an elementary form of the device. This construction is also arranged so that the device must be placed directly on the surface of the photographic paper.

In Figure 1 the device is shown as it may be made, wherein numeral 1 indicates a stand, numeral 2 a mirror, numeral 3 a ground-glass screen, or any partially transparent sheet of material, and numeral 4 a magnifying glass or lens.

The stand 1, which may be of any type or design, is shown as formed with a base 5 that is placed directly upon a paper or plate 6, upon which an enlargement may be made.

The stand 1 is formed with a base 5, and an angular plate is mounted in the upper part with a section 7, and a lower part 8 extending at an angle to the section 7 and to the lower surface of the base 5. The mirror 2 is mounted on the part 8. The section 7 is provided with a partition 9, having an opening 10 therein, and the ground-glass screen 3 is placed on the partition and adapted to extend over the opening 10. Since the device as shown in Figure 1 is adapted to be placed directly on the surface of the photographic paper while focusing the enlarger, the distance from the screen 3 to the mirror 2 must be equivalent to the distance from the mirror 2 to the lower surface of the base 5. This is accomplished by so arranging the mounting positions of mirror 2 and screen 3 that the mirror 2 lies in a plane bisecting the angle formed between the plane of the screen 3 and the plane of the lower surface of the base 5. This is shown diagrammatically on Figure 1 by making the angles 11 and 12 equal to each other. The upper end of the plate 7 is provided with a clip 13 in which the magnifying lens 4 is mounted, and it will be noted that by looking through the lens on the line of sight, which is indicated by the letter $x$, it will be possible to see the image upon the ground-glass screen 3, or if this device is relatively small only a portion of the image will appear on the screen. Any part or section of the picture may, therefore, be used to illustrate whether or not the lines of the enlargement are in focus, and the device may be moved over the picture to any part or spot desired.

In the design shown in Figure 4, the mirror, which is indicated by the numeral 14, is mounted upon the lower part of a bent plate 15, on a base 16, substantially the same as shown in Figure 1; however, the ground-glass screen 17, similar to the screen 3, is mounted upon a plate 18, that is slidably mounted in slots 19 and 20, and held by screws 21, so that the position thereof may be adjusted. The plate 18 is provided with an opening 22, through which the line of sight travels. In this design the angular positions of screen 17 and mirror 14 are fixed, according to the requirements shown in the description of Figure 1, with the difference that the distance from screen 17 to mirror 14 may be changed without disturbing the angular relationship of the parts. This is done so that the base 16 of the device need not be placed directly on the surface of the photographic paper, but may be placed on any desired surface which is fixed in relation to the surface of the photographic paper; such as, some portion of an easel used to hold the photographic paper while enlarging. Then the position of screen 17 may be so adjusted that its distance from mirror 14 is the same as the distance from mirror 14 to the surface of the photographic paper. When this adjustment is made, then the relationship of planes, angles, and distances will be the same as that described in connection with Figure 1, except that the plane of the surface of the photographic paper will be considered instead of the plane of the lower surface of the base. In this design a lens 23, similar to the lens 4 of Figure 1, is mounted in a frame 24, and this is provided with a lug 25 extending through a slot 26, and adapted to be moved by a screw 27 in a flange 28, at the upper end of the plate 15; and it will be noted that the screw 27 may be turned to move the lens 23 upward and downward to adjust the size of the image. It will be understood that any other means may be used for adjusting any of the parts.

In the design shown in Figure 5 the device is shown in a very simple form, in which a mirror 29 is mounted upon a base 30, and a ground-glass screen 31 is mounted in slots 32, above the mirror 29. The frame in this design may be made of wood, or any material. In this design, as in Figure 1, the device is to be placed directly on the surface of the photographic paper when focusing the enlarger.

Figure 3 shows a practical application of the device, however, it will be understood that it may be used in combination with enlarging means of any type or design. In this figure, a base 33 is shown with enlarging apparatus adjustably mounted on a post 34 through a bracket 35, which may be held by a set screw 36. The apparatus shown is provided with a film holder 37, a lens 38, a reflector 39, and a light 40; and the lens 38 is adjustably mounted on a stem 41 through a hub 42, and may be held by a set screw 43. In this design the device is indicated by the numeral 44, and a mirror 45 is adjustably mounted thereon, with a ground-glass screen 46 held in a slot 47, and a lens or opening 48 mounted in a slot 49. This shows the line of sight from the enlarging apparatus passing directly downward on the line 50, and this is reflected upward on the line 51 to an eye, as indicated by the numeral 52. It will be understood that the proportionate sizes of any of the parts may be varied.

It will also be understood that the relative positions of any of the parts may be adjustable in relation to each other, and in Figure 3 the device is shown with the frame 53 pivotally mounted on a pin 54, having a screw 55, and the pin 54 is vertically slidable in a hub 56 of the base 44, and this pin may be held by a set screw 57. The plates 46 and 48 are also adjustably mounted in relation to the mirror, through a hub 58 on the section 59 of the frame which is pivotally attached to the section 53 through a hinge joint 60, in which it is held by a screw 61. The parts 46 and 48 may also be mounted, in the design shown in Figure 3, as in the design shown in Figure 4, so that the distance between the parts and the mirror 45 may also be adjusted. In the design shown in Figure 3, it is possible for the user of the device to adjust the angle of the optical axis of the device to any convenient angle for viewing, and then to adjust the angle of the mirror and the height of the device so as to get a correct indication of proper focus of the enlarger.

It will be noted that the base of the support or stand may be provided with bolt or screw holes 62, as shown in Figure 4, by which the device may be attached to any surface. It will be understood that other changes may be made without departing from the spirit of the invention, one of which changes may be in the use of any other means for mounting the mirror and ground-glass screen, another may be in the use of other means for adjusting the relative positions thereof, another may be in the use of translucent or semi-transparent screen materials other than ground-glass, and still another may be in the use of these devices in combination with other means for enlarging the image as seen upon the ground-glass screen.

The construction will be readily understood from the foregoing description. In use the device may be provided preferably in the most simple form, and when adjusting the position of the enlargement lens, which is indicated by the numeral 38, and shown in Figure 3, this device may be placed upon the paper upon which the print is to be made, and by looking through an opening, magnifying lens, or directly upon the ground-glass screen, any part of the picture or image may be observed, and as the screen is exactly the same distance from the point of intersection of the line of sight, as from this point to the paper the image will appear in exactly the same size, so that if the lines as seen on the screen are clear and sharp the print will also be clear and sharp, or in focus; and by using the magnifying lens in combination with the ground-glass screen, it is possible to enlarge the image viewed upon the screen, so that one may be absolutely sure of having the print in focus. It will also be noted that with this device it is not necessary to place the eye at, or against, the screen or lens, as the eye may be located several feet away from the device. It will also be noted that in adjusting the angles and positions of the respective parts, the intersection of the planes of the ground-glass screen and the mirror should lie in the plane of the surface of the photographic paper, for proper adjustment of the device.

Having thus fully described the invention, what I claim as new and desire to secure by Letters Patent, is:

1. A focusing device for photographic enlargements of the type adapted to be placed upon a surface upon which photographic paper, upon which an enlargement is to be made, may be placed, and adapted to intercept a portion of a picture being projected thereon, and which consists of a reflecting surface, a screen and an enlarging lens, with the parts positioned with the distance from the reflecting surface to the screen equal to the distance from the reflecting surface to the surface upon which the paper may be placed; said device characterized in that it comprises a base member, and an angularly positioned mounting member for the respective parts, in which the mounting member comprises a relatively flat plate angularly formed, with the lower portion secured to the base, and with the mirror, screen, and enlarging lens mounted upon an upwardly extending leg in their respective positions, and with the enlarging lens positioned at the upper end of said leg.

2. A focusing device for photographic enlargements as described in claim 1, characterized in that the screen and lens are slidably mounted upon the mounting member, providing adjustment in the distances between the reflecting surface, screen and lens.

DONALD H. CASTLE.